(12) United States Patent
Wu et al.

(10) Patent No.: US 12,015,556 B2
(45) Date of Patent: *Jun. 18, 2024

(54) METHOD, APPARATUS, AND SYSTEM FOR GENERATING, AND PROCESSING PACKETS ACCORDING TO, A FLOW FILTERING RULE

(71) Applicant: Huawei Technologies Co., Ltd., Shenzhen (CN)

(72) Inventors: Hong Wu, Beijing (CN); Jianbo Zhu, Dongguan (CN); Ruiqing Cao, Beijing (CN); Zhenbin Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/156,175

(22) Filed: Jan. 18, 2023

(65) Prior Publication Data

US 2023/0179523 A1 Jun. 8, 2023

Related U.S. Application Data

(63) Continuation of application No. 17/186,385, filed on Feb. 26, 2021, now Pat. No. 11,575,606, which is a
(Continued)

(30) Foreign Application Priority Data

Aug. 30, 2018 (CN) .......................... 201811004608.6

(51) Int. Cl.
*H04L 47/00* (2022.01)
*H04L 47/12* (2022.01)

(52) U.S. Cl.
CPC .................................... *H04L 47/12* (2013.01)

(58) Field of Classification Search
None
See application file for complete search history.

(56) References Cited

U.S. PATENT DOCUMENTS 6,147,976 A 11/2000 Shand et al.
8,281,397 B2 10/2012 Vaidyanathan et al.
(Continued)

FOREIGN PATENT DOCUMENTS

CN 1697443 A 11/2005
CN 101159636 A 4/2008
(Continued)

OTHER PUBLICATIONS

Hao, W. et al., "Dissemination of Flow Specification Rules for L2 VPN draft-ietf-idr-flowspec-12vpn-08," Network Working Group, Internet-Draft, Intended Status: Standards Track, Expires: Jan. 4, 2019, Jul. 3, 2018, 13 pages.
(Continued)

*Primary Examiner* — Gerald A Smarth
(74) *Attorney, Agent, or Firm* — Slater Matsil, LLP

(57) ABSTRACT

A packet processing method and apparatus, and a related device, the method including generating, by a first device, a flow filtering rule, where the flow filtering rule includes a match item and an action item, and where the match item comprises an Internet Protocol (IP) address and an autonomous domain identifier, and sending, by the first device, the flow filtering rule to a second device, where the action item is used to instruct the second device to process, based on a packet processing mode indicated by the action item, a packet matching the match item.

18 Claims, 5 Drawing Sheets

Related U.S. Application Data continuation of application No. PCT/CN2019/102899, filed on Aug. 27, 2019.

(56) References Cited

U.S. PATENT DOCUMENTS

| | | | |
|---|---|---|---|
| 8,583,683 B2* | 11/2013 | Rathod | G06Q 30/0249 707/770 |
| 8,925,079 B2 | 12/2014 | Vaidyanathan et al. | |
| 9,413,783 B1 | 8/2016 | Keogh | |
| 10,298,502 B2 | 5/2019 | Wang et al. | |
| 10,348,571 B2 | 7/2019 | Mehta et al. | |
| 2002/0163884 A1 | 11/2002 | Peles et al. | |
| 2005/0198224 A1 | 9/2005 | Kobayashi et al. | |
| 2014/0351878 A1 | 11/2014 | Zegman et al. | |
| 2017/0163532 A1 | 6/2017 | Tubaltsev et al. | |
| 2018/0063084 A1 | 3/2018 | Wakumoto et al. | |
| 2018/0302443 A1 | 10/2018 | Weiss et al. | |
| 2021/0194745 A1* | 6/2021 | Pan | H04W 56/00 |

FOREIGN PATENT DOCUMENTS

| | | | | |
|---|---|---|---|---|
| CN | 101917434 | A | 12/2010 | |
| CN | 103036733 | A | 4/2013 | |
| CN | 104796348 | A | 7/2015 | |
| CN | 105871576 | A | 8/2016 | |
| CN | 106254152 | A | 12/2016 | |
| CN | 106341423 | A | 1/2017 | |
| CN | 106506274 | A * | 3/2017 | ............ H04L 43/10 |
| CN | 106657161 | A | 5/2017 | |
| CN | 107846341 | A | 3/2018 | |
| JP | 2005252450 | A | 9/2005 | |
| JP | 2009284456 | A | 12/2009 | |
| JP | 2011234331 | A | 11/2011 | |
| JP | 2013106354 | A | 5/2013 | |
| WO | 2008114007 | A1 | 9/2008 | |

OTHER PUBLICATIONS

Marques, P. et al., "Dissemination of Flow Specification Rules," Network Working Group, Request for Comments: 5575, Category: Standards Track, RFC 5575, Aug. 2009, 22 pages.

Rekhter, Y. et al., "A Border Gateway Protocol 4 (BGP-4)," Network Working Group, Request for Comments: 4271, Obsoletes: 1771, Category: Standards Track, Jan. 2006, 104 pages.

Wu J. et al., "Inter-AS Source Address Validation on IPv6 Network," Sciencepaper Online, vol. 2, No. 10, Oct. 2007, 8 pages (with partial machine translation).

* cited by examiner

METHOD, APPARATUS, AND SYSTEM FOR GENERATING, AND PROCESSING PACKETS ACCORDING TO, A FLOW FILTERING RULE

CROSS-REFERENCE TO RELATED APPLICATIONS

This application is a continuation of U.S. patent application Ser. No. 17/186,385, filed Feb. 26, 2021, which is a continuation of International Application No. PCT/CN2019/102899, filed on Aug. 27, 2019, which claims priority to Chinese Patent Application No. 201811004608.6, filed on Aug. 30, 2018. The disclosures of the aforementioned applications are hereby incorporated by reference in their entireties.

TECHNICAL FIELD

This application relates to the network communications field, and in particular, to a packet processing method and apparatus, and a related device.

BACKGROUND

In a network communication process, a packet may be forwarded by a forwarding device such as a router or a switch. For example, after a router receives a packet, the router may search a routing and forwarding table (forwarding information base, FIB) based on information about the packet, such as a source internet protocol (IP) address and a destination IP address, to determine next-hop information corresponding to the packet, and forward the packet to a corresponding network device such as another router, a terminal, or a server. However, the forwarding device relies on network resources for packet forwarding. The network resources include, for example, a bandwidth, a buffer space, and a processing capability of the forwarding device. When required network resources exceed currently available network resources, network congestion may occur. Therefore, flow of the forwarding device may be controlled to avoid the network congestion.

To implement flow control, the control device may analyze the flow of the forwarding device to obtain a flow filtering rule, and then deliver the flow filtering rule to the forwarding device. The forwarding device processes the packet according to the flow filtering rule, for example, redirects or discards the packet, so as to implement flow control. In a conventional manner, the control device configures one flow filtering rule for each pair of network devices that use the forwarding device for communication. When there are a large quantity of network devices, a large quantity of flow filtering rules are configured, so that more network resources need to be occupied to deliver the flow filtering rule from the control device to the forwarding device, and further the forwarding device also occupies a large quantity of storage resources.

SUMMARY

Embodiments of this application provide a packet processing method and apparatus, and a related device, to resolve a problem that a lot of network resources are occupied due to delivery of a large quantity of flow filtering rules.

An embodiment of this application provides a packet processing method, where the method is applied to a first device, and specifically includes the following steps. The first device first generates a flow filtering rule, and then sends the flow filtering rule to a second device, where the flow filtering rule includes a match item and an action item, the match item includes an internet protocol IP address and an autonomous domain identifier, and the action item is used to instruct the second device to process, based on a packet processing mode indicated by the action item, a packet matching the match item. The first device may be a control device for generating and delivering a flow filtering rule, and may be a server, a terminal, a router, or the like. Specifically, a Border Gateway Protocol flow specification server may be set as the first device. The second device may be a forwarding device, such as a router, a switch, a bridge, or a gateway.

That is, in this embodiment of this application, IP addresses of network devices in an autonomous domain corresponding to an autonomous domain identifier are aggregated, and a flow filtering rule is generated based on the autonomous domain identifier. For example, when the IP address in the match item is a source IP address of a received packet, the autonomous domain is an autonomous domain to which a device corresponding to a destination address of the received packet belongs, so that only one filtering rule needs to be generated for all the network devices in the autonomous domain. A separate filtering rule no longer needs to be generated for each device in the autonomous domain, so that the quantity of flow filtering rules generated is reduced, and network resources required for delivering the flow filtering rules to the second device are reduced.

Optionally, the IP address may be a source IP address of the packet. Correspondingly, the autonomous domain identifier is an identifier of an autonomous domain to which a device corresponding to a destination IP address of the packet belongs. Alternatively, the IP address may be a destination IP address of the packet. Correspondingly, the autonomous domain identifier is an identifier of an autonomous domain to which a device corresponding to a source IP address of the packet belongs. Autonomous domain identifiers are used to distinguish between different autonomous domains. For example, an autonomous domain identifier of China Telecom may be AS1000, and an autonomous domain identifier of China Mobile may be AS2000.

Optionally, the autonomous domain identifier is an identifier of an autonomous domain to which the second device belongs. If the second device and a network device corresponding to a source IP address belong to the same autonomous domain, when a flow filtering rule is generated, an autonomous domain identifier of an autonomous domain to which the device corresponding to the source IP address belongs can be obtained by obtaining an autonomous domain identifier of an autonomous domain to which the second device belongs. If the second device and a network device corresponding to a destination IP address belong to the same autonomous domain, an autonomous domain identifier of an autonomous domain to which the destination IP address belongs can also be obtained by obtaining an autonomous domain identifier of an autonomous domain to which the second device belongs.

An embodiment of this application further provides a packet processing method, where the method is applied to a second device, and specifically includes the following steps. The second device receives a flow filtering rule sent by a first device, where the flow filtering rule includes a match item and an action item, and the match item includes an internet protocol IP address and an autonomous domain identifier, the second device receives a packet, and determines a routing and forwarding entry based on a first address in the packet, where the routing and forwarding entry includes an autonomous domain identifier, and when determining that a second address of the packet matches the IP address in the flow filtering rule and the autonomous domain identifier in the routing and forwarding entry is the same as the autonomous domain identifier in the flow filtering rule, the second device processes the packet based on a packet processing mode indicated by the action item.

In this embodiment of this application, IP addresses of network devices in an autonomous domain corresponding to an autonomous domain identifier are aggregated, and a flow filtering rule is generated based on the autonomous domain identifier. For example, when the IP address in the match item is a destination IP address of the received packet, the autonomous domain is an autonomous domain to which a device corresponding to a source IP address of the packet belongs, so that only one filtering rule needs to be generated for all the network devices in the autonomous domain. A separate filtering rule no longer needs to be generated for each device in the autonomous domain, so that the quantity of flow filtering rules generated is reduced, and the quantity of filtering rules stored in the second device is greatly reduced, thereby saving storage resources of the second device.

Optionally, the first address may be the destination IP address of the packet, and correspondingly, the second address is the source IP address of the packet. Alternatively, the first address may be the source IP address of the packet, and correspondingly, the second address is the destination IP address of the packet.

Optionally, the packet processing mode indicated by the action item includes one or more processing modes, including discarding the packet, redirecting the packet, and marking the packet.

Discarding the packet means that the packet is not forwarded, and the packet is deleted. Redirecting the packet means that next-hop information corresponding to the packet is changed, so as to change a forwarding path of the packet and control flow in a network. Marking a packet means that the packet is marked for subsequent processing, such as flow statistics collection.

Optionally, the method further includes generating an access control list according to the flow filtering rule, where the access control list stores the IP address, an autonomous domain index, and the action item, and the autonomous domain index corresponds to the autonomous domain identifier. Because the access control list is generally capable of storing a small quantity of characters, an autonomous domain index with a small quantity of characters is stored in the access control list in place of the autonomous domain identifier, and a mapping relationship between the autonomous domain index and the autonomous domain identifier can be established, so that the autonomous domain index can be subsequently found based on the autonomous domain identifier.

Then, that when determining that a second address of the packet matches the IP address in the flow filtering rule and the autonomous domain identifier in the routing and forwarding entry is the same as the autonomous domain identifier in the flow filtering rule, the second device processes the packet based on the packet processing mode indicated by the action item includes, when determining that the second address of the packet is the same as the IP address in the access control list and the autonomous domain identifier in the routing and forwarding entry matches the autonomous domain index in the access control list, the second device processes the packet based on the packet processing mode indicated by the action item stored in the access control list.

An embodiment of this application further provides a packet processing apparatus, where the apparatus is used in a first device, and includes a rule generation unit, configured to generate a flow filtering rule, where the flow filtering rule includes a match item and an action item, and the match item includes an internet protocol IP address and an autonomous domain identifier, and a rule sending unit, configured to send the flow filtering rule to a second device, where the action item is used to instruct the second device to process, based on a packet processing mode indicated by the action item, a packet matching the match item.

Optionally, the IP address is a source IP address of the packet, and the autonomous domain identifier is an identifier of an autonomous domain to which a device corresponding to a destination IP address of the packet belongs.

Optionally, the IP address is a destination IP address of the packet, and the autonomous domain identifier is an identifier of an autonomous domain to which a device corresponding to a source IP address of the packet belongs.

Optionally, the autonomous domain identifier is an identifier of an autonomous domain to which the second device belongs.

An embodiment of this application further provides a packet processing apparatus, where the apparatus is used in a second device, and includes a rule receiving unit, configured to receive a flow filtering rule sent by a first device, where the flow filtering rule includes a match item and an action item, and the match item includes an internet protocol IP address and an autonomous domain identifier, a packet receiving unit, configured to receive a packet, and determine a routing and forwarding entry based on a first address in the packet, where the routing and forwarding entry includes an autonomous domain identifier, and a packet processing unit, configured to, when it is determined that a second address of the packet matches the IP address in the flow filtering rule and the autonomous domain identifier in the routing and forwarding entry is the same as the autonomous domain identifier in the flow filtering rule, process the packet based on the packet processing mode indicated by the action item.

Optionally, the first address is a destination IP address of the packet, and the second address is a source IP address of the packet.

Optionally, the first address is a source IP address of the packet, and the second address is a destination IP address of the packet.

Optionally, the packet processing mode indicated by the action item includes one or more processing modes, including discarding the packet, redirecting the packet, and marking the packet.

Optionally, the apparatus further includes a list generation unit, configured to generate an access control list according to the flow filtering rule, where the access control list stores the IP address, an autonomous domain index, and the action item, and the autonomous domain index corresponds to the autonomous domain identifier, and the packet processing unit is specifically configured to when determining that the second address of the packet is the same as the IP address in the access control list and the autonomous domain identifier in the routing and forwarding entry matches the autonomous domain index in the access control list, process the packet based on the packet processing mode indicated by the action item stored in the access control list.

An embodiment of this application further provides a packet processing device, where the device is a first device, and the first device includes a storage unit, a processing unit, and a communications unit, the storage unit is configured to store an instruction, the processing unit is configured to execute the instruction in the storage unit, so as to perform the foregoing packet processing method applied to the first device, and the communications unit is configured to communicate with a second device.

An embodiment of this application further provides a packet processing device, where the device is a second device, and the second device includes a storage unit, a processing unit, and a communications unit, the storage unit is configured to store an instruction, the processing unit is configured to execute the instruction in the storage unit, so as to perform the foregoing packet processing method applied to the second device, and the communications unit is configured to communicate with a first device.

An embodiment of this application further provides a computer-readable storage medium, where the computer-readable storage medium stores an instruction, and when the instruction is run on a computer, the computer is enabled to perform the foregoing packet processing method applied to the first device and/or the foregoing packet processing method applied to the second device.

An embodiment of this application further provides a computer program product including an instruction, where when the computer program product runs on a computer, the computer is enabled to perform the foregoing packet processing method applied to the first device and/or the foregoing packet processing method applied to the second device.

An embodiment of this application further provides a packet processing system, where the system includes the foregoing first device and second device.

DETAILED DESCRIPTION OF ILLUSTRATIVE EMBODIMENTS

Embodiments of this application provide a packet processing method and apparatus, and a related device, so as to resolve the problem that each forwarding device delivers a large quantity of flow filtering rules and reduce waste of network resources.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present invention described herein can be implemented in orders other than the order illustrated or described herein. In addition, the terms "include", "contain" and any other variants mean to cover the non-exclusive inclusion, for example, a process, method, system, product, or device that includes a list of steps or units is not necessarily limited to those clearly listed steps or units, but may include other steps or units not explicitly listed or inherent to the process, method, system, product, or device.

Figure 1:
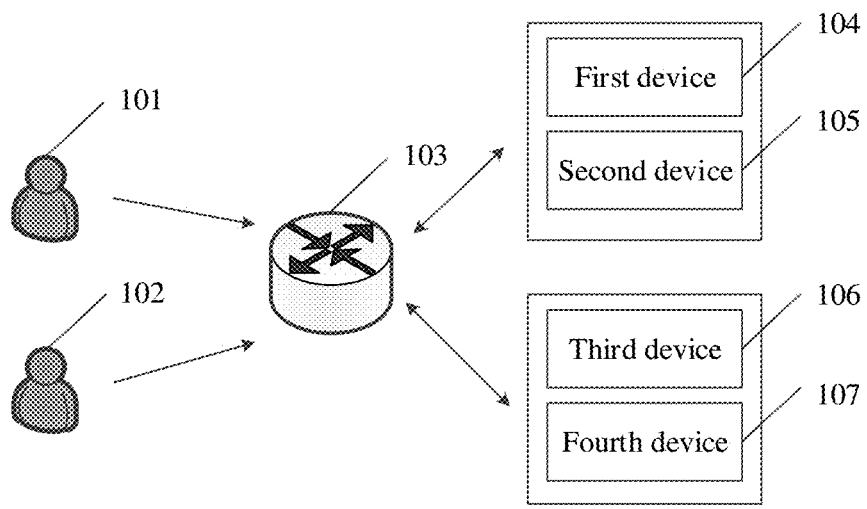
FIG. 1 is a schematic diagram of a forwarding device according to an embodiment of this application.

In a conventional technology, a packet may be forwarded by a forwarding device. After receiving the packet, the forwarding device may determine next-hop information corresponding to the packet based on a routing and forwarding table, and forward the packet to another corresponding network device. For example, referring to FIG. 1, a first user 101 and a second user 102 may send a packet to a forwarding device 103, and the forwarding device 103 forwards the received packet to a first device 104, a second device 105, a third device 106, and a fourth device 107. An address of the first device 104 is a first address, an address of the second device 105 is a second address, an address of the third device 106 is a third address, and an address of the fourth device 107 is a fourth address.

However, the forwarding device relies on network resources for packet forwarding, such as the bandwidth, the buffer space, and the processing capability of the forwarding device. If required network resources exceed currently available network resources, network congestion may occur. For example, an illegal user may launch an attack by using clients or servers of a distributed denial of service (DDOS), that is, a plurality of computers are combined as an attack platform to launch a DDOS attack on one or more targets, so that a network is congested, and normal service operation on a target device is affected, thereby achieving an attack purpose.

To effectively prevent the network from being congested, flow control may be performed on the forwarding device. Specifically, flow of the forwarding device may be analyzed to obtain a flow filtering rule, and a flow filtering rule is issued for the forwarding device. The forwarding device processes a packet according to the flow filtering rule, for example, redirects or discards the packet, so as to implement flow control.

Figure 2:
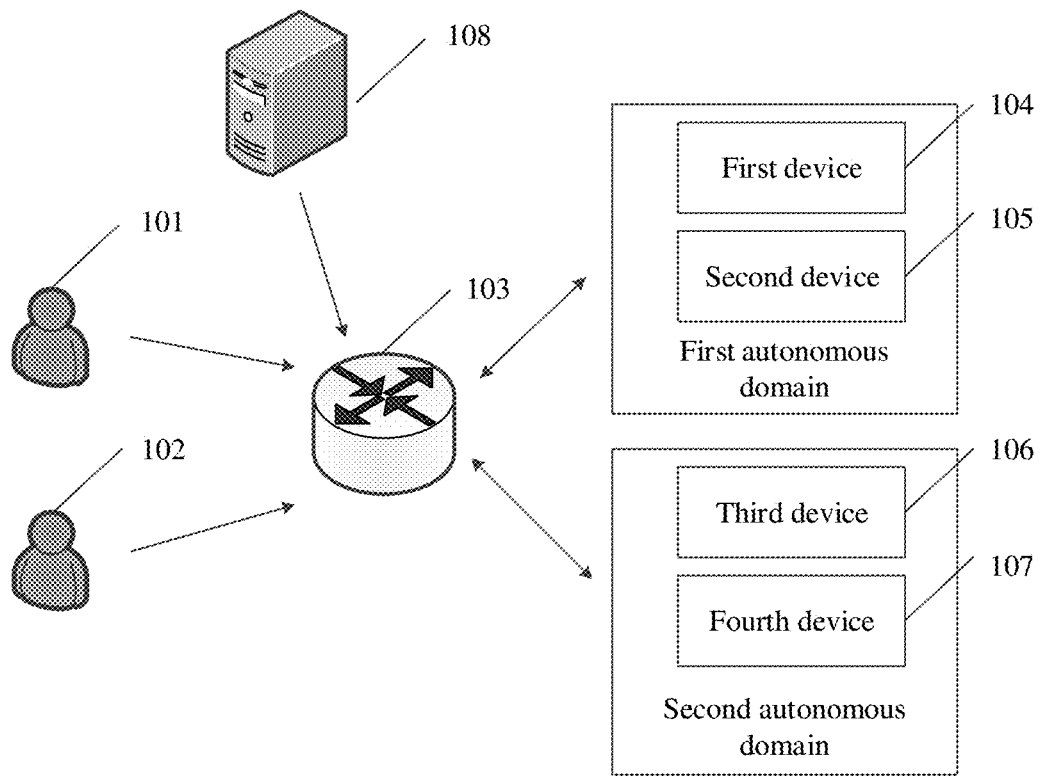
FIG. 2 is a schematic diagram of a flow control system according to an embodiment of this application.

For example, FIG. 2 is a schematic diagram of a flow control system according to an embodiment of this application. Flow of a forwarding device 103 may be analyzed by a control device 108 to obtain a flow filtering rule, and a flow filtering rule is issued to the forwarding device 103. The forwarding device 103 may process a received packet according to the flow filtering rule.

However, generally, there is a large quantity of network devices in a network. Therefore, one flow filtering rule needs to be configured for each pair of network devices that perform communication through a forwarding device. When there are a large quantity of network devices, a large quantity of flow filtering rules are configured, and a large quantity of flow filtering rules generated are delivered to each forwarding device, so that flow control can be implemented for each forwarding device. Consequently, a large quantity of network resources are occupied.

For example, referring to FIG. 2, the first user 101 may send a packet to the first device 104 through the forwarding device 103, and may correspondingly configure one flow filtering rule, for example, a match item in the filtering rule includes an IP address of the first user and a first IP address. The second user 102 may send a packet to the first device 104 through the forwarding device 103, and may correspondingly configure one flow filtering rule, for example, a match item in the filtering rule includes an IP address of the second user and the first IP address. Therefore, eight flow filtering rules need to be configured for the two users and four IP addresses shown in FIG. 2. Likewise, if m users have source IP addresses and access n IP addresses, and the network has a destination IP address, to control flow of the m users accessing the n IP addresses, m×n flow filtering rules need to be generated based on the m source IP addresses and the n destination IP addresses. The m×n flow filtering rules are distributed to each forwarding device, so that the forwarding device can perform corresponding processing on the received packet. The filtering rule distribution process occupies a large quantity of network resources, and a large quantity of storage resources is occupied by the forwarding device to store these filtering rules.

Embodiments of this application provide a packet processing method and apparatus, and a related device, so as to resolve the technical problem that network resources are wasted because a large quantity of flow filtering rules are generated and delivered. Specifically, the first device generates a flow filtering rule, and sends the flow filtering rule to the second device. The flow filtering rule includes a match item and an action item, the match item includes an IP address and an autonomous system (AS) identifier (ID), and the action item is used to instruct the second device to process, based on a packet processing mode indicated by the action item, a packet matching the match item. That is, in this embodiment of this application, IP addresses of network devices in an autonomous domain corresponding to the autonomous domain identifier are aggregated, and a flow filtering rule is generated based on the autonomous domain identifier. In this way, only one flow filtering rule needs to be generated for all the network devices in the autonomous domain that communicate with a network device corresponding to the IP address in the match item, and one flow filtering rule no longer needs to be generated for each network device in the autonomous domain as in the conventional technology, so that the quantity of flow filtering rules generated is reduced, and the quantity of network resources required for delivering the flow filtering rules to the second device is also reduced.

Figure 3:
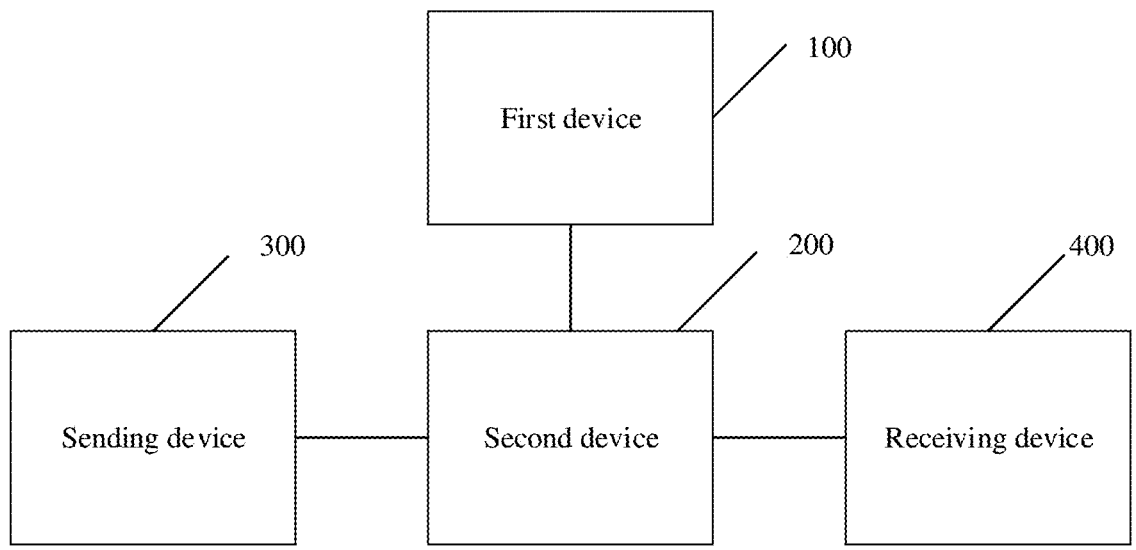
FIG. 3 is a structural block diagram of a packet processing system according to an embodiment of this application.

FIG. 3 is a schematic diagram of a framework of a system according to an embodiment of this application. The system includes a first device 100, a second device 200, a sending device 300, and a receiving device 400. The first device 100 is connected to the second device 200, and both the sending device 300 and the receiving device 400 are connected to the second device 200.

The first device wo may be a controller in a software defined network (software defined network, SDN), or another device, such as a network management device, a server, a terminal, or a router, where the server is, for example, a Border Gateway Protocol (border gateway protocol, BGP) flow specification server (flow specification server). The first device 100 is configured to generate a flow filtering rule, where the flow filtering rule includes a match item and an action item, the match item includes an IP address and an autonomous domain identifier, and the action item in the flow filtering rule may be used to instruct the second device to process a packet corresponding to the match item according to a packet processing mode indicated by the action item.

The second device 200 may be a forwarding device, such as a router or a switch, and is configured to send a received packet from the sending device 300 to the receiving device 400. The sending device 300 and the receiving device 400 each may be a terminal, a server, or a device connected to a user.

The second device 200 receives the flow filtering rule sent by the first device loft After receiving the packet sent by the sending device 300, the second device 200 may determine a routing and forwarding entry based on the first address in the packet, where the routing and forwarding entry includes an autonomous domain identifier. When it is determined that a first address of the packet matches the IP address in the flow filtering rule and the autonomous domain identifier in the routing and forwarding entry is the same as the autonomous domain identifier in the flow filtering rule, the second device 200 processes the packet based on the packet processing mode indicated by the action item.

The first address may be a destination IP address of the packet, and the second address may be a source IP address of the packet. Alternatively, the first address is a source IP address of the packet, and the second address is a destination IP address of the packet.

For example, a match item in the flow filtering rule may include a source IP address IP-1 and an autonomous domain identifier AS1000 of an autonomous domain to which a device corresponding to a destination IP address belongs, and an action item corresponding to the match item may be discarding. If the second device 200 receives a packet M1 whose source IP address is IP-1 and whose destination IP address is IP-2, the second device 200 may search the routing and forwarding table based on the destination IP address to obtain a routing and forwarding entry corresponding to the destination IP address, where the routing and forwarding entry includes the destination IP address IP-2 and an autonomous domain identifier of an autonomous domain to which the destination IP address belongs. When the autonomous domain identifier corresponding to the destination IP address IP-2 is AS1000, and because the source IP address of the packet M1 is the same as the IP address in the flow filtering rule and both are IP-1, it can be considered that the packet matches the match item in the flow filtering rule, and the second device 200 can discard the packet M1 based on the packet processing mode indicated by the corresponding action item.

For ease of understanding, the embodiments of this application are described in detail below.

Figure 4:
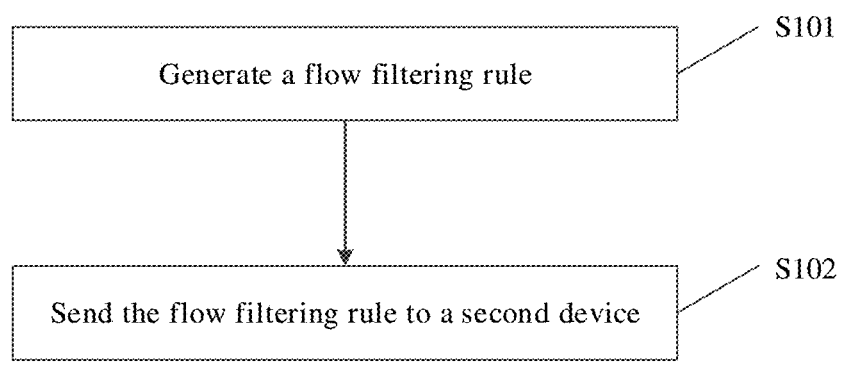
FIG. 4 is a flowchart of a packet processing method according to an embodiment of this application.

FIG. 4 is a flowchart of a packet processing method according to an embodiment of this application. The method may be applied to a first device, and includes the following steps.

S101. Generate a flow filtering rule.

The first device may be a control device for generating and delivering a flow filtering rule, and may be a server, a terminal, a router, or the like. Specifically, a Border Gateway Protocol flow specification server may be set as the first device.

The flow filtering rule is a rule used to instruct the second device to match and process a packet, and may include a match item and an action item. The match item may include an IP address and an autonomous domain identifier. Specifically, if the IP address is a source IP address of the packet, the autonomous domain identifier is an autonomous domain identifier of an autonomous domain to which a device corresponding to a destination IP address of the packet belongs, or if the IP address is a destination IP address of the packet, the autonomous domain identifier is an autonomous domain identifier of an autonomous domain to which a device corresponding to a source IP address of the packet belongs. Autonomous domain identifiers are used to distinguish between different autonomous domains. For example, an autonomous domain identifier of China Telecom may be AS1000, and an autonomous domain identifier of China Mobile may be AS2000.

To enable the first device to generate a flow filtering rule, the first device may obtain information about a packet received by the second device, where the packet information includes a source IP address and a destination IP address of a packet. In addition, the first device needs to obtain an autonomous domain identifier corresponding to the source IP address or the destination IP address. If the second device and a network device corresponding to a source IP address belong to the same autonomous domain, an autonomous domain identifier of an autonomous domain to which the device corresponding to the source IP address belongs can be obtained by obtaining an autonomous domain identifier of an autonomous domain to which the second device belongs. If the second device and a network device corresponding to a destination IP address belong to the same autonomous domain, an autonomous domain identifier of an autonomous domain to which the destination IP address belongs can also be obtained by obtaining an autonomous domain identifier of an autonomous domain to which the second device belongs. That is, in this case, the autonomous domain identifier in the match item is the autonomous domain identifier of the autonomous domain to which the second device belongs. However, if the second device is independent of the autonomous domain to which the device corresponding to the source IP address belongs or the autonomous domain to which the device corresponding to the destination IP address belongs, the autonomous domain identifier needs to be obtained using another method, for example, the corresponding autonomous domain identifier needs to be directly configured in the first device based on the source IP address or the destination IP address.

In this embodiment of this application, the purpose of reducing the quantity of flow filtering rules generated is achieved through clustering of source IP addresses or destination IP addresses based on the autonomous domain identifier.

For example, when m users access n IP addresses, in the prior aft, m×n flow filtering rules need to be generated to implement flow control. However, if the n IP addresses belong to the same autonomous domain and the autonomous domain identifier of the n IP addresses is A, m×1 flow filtering rules need to be generated, and the match item in each flow filtering rule includes the autonomous domain identifier A and an IP address of one of the users, thereby effectively reducing the quantity of flow filtering rules.

Referring to FIG. 2, if the first IP address 104 and the second IP address 105 belong to a first autonomous domain, a match term may include an IP address of the first user 101 and an identifier of the first autonomous domain, and the match term may be used to match a packet generated by the first user 101 by accessing the first IP address 104 and/or the second IP address 105 through the forwarding device 103. If the third IP address 106 and the fourth IP address 107 belong to a second autonomous domain, a match term may include an IP address of the first user 101 and an identifier of the second autonomous domain, and the match term is used to match a packet generated by the first user 101 by accessing the third IP address 106 and/or the fourth IP address 107 through the forwarding device 103. Therefore, two flow filtering rules can be generated for two users accessing the first autonomous domain, and two flow filtering rules can be generated for two users accessing the second autonomous domain.

Likewise, if m users belong to the same autonomous domain and their autonomous domain identifiers are B, 1×n flow filtering rules may be generated, and a match item in each flow filtering rule includes the autonomous domain identifier B and one of the n IP addresses. The quantity of flow filtering rules can also be effectively reduced as compared with the prior art.

Further, in addition to the IP address and the autonomous domain identifier, a match item may also include other information about the packet, such as one or more of an IP protocol, a source port, a destination port, an Internet Control Message Protocol (ICMP) type, an ICMP code, a Transmission Control Protocol (TCP) flag, a packet length, and a differentiated services code point (DSCP).

An action item in the flow filtering rule corresponds to the match item, and is used to instruct to process, based on a packet processing mode indicated by the action item, a packet matching the match item. The action item may include discarding the packet, redirecting the packet, and marking the packet. Discarding the packet means that the packet is not forwarded, and the packet is deleted. Redirecting the packet means that next-hop information corresponding to the packet is changed, so as to change a forwarding path of the packet and control flow in a network. Marking a packet means that the packet is marked for subsequent processing, such as flow statistics collection.

S102. Send the flow filtering rule to the second device.

The second device may be a forwarding device, such as a router, a switch, a bridge, or a gateway. The first device may send a flow filtering rule with a match item and an action item to the second device, so that the second device performs matching on the packet. When the packet matches the match item, the second device processes the packet based on the packet processing mode indicated by the action item corresponding to the match item.

Because a relative small quantity of flow filtering rules are generated, the first device sends a small quantity of flow filtering rules to the second device, thereby saving network resources and saving storage resources of the second device.

In a packet processing method provided in this embodiment of this application, the first device first generates a flow filtering rule, and then sends the flow filtering rule to the second device, where the flow filtering rule includes a match item and an action item, the match item includes an IP address and an autonomous domain identifier, and the action item is used to instruct the second device to process, based on the packet processing mode indicated by the action item, the packet matching the match item. That is, in this embodiment of this application, IP addresses of network devices in an autonomous domain corresponding to the autonomous domain identifier are aggregated, and a flow filtering rule is generated based on the autonomous domain identifier. In this way, only one flow filtering rule needs to be generated for all the network devices in the autonomous domain that communicate with a network device corresponding to the IP address in the match item, and one flow filtering rule no longer needs to be generated for each network device in the autonomous domain as in the conventional technology, so that the quantity of flow filtering rules generated is reduced, and the quantity of network resources required for delivering the flow filtering rules to the second device is also reduced.

Figure 5:
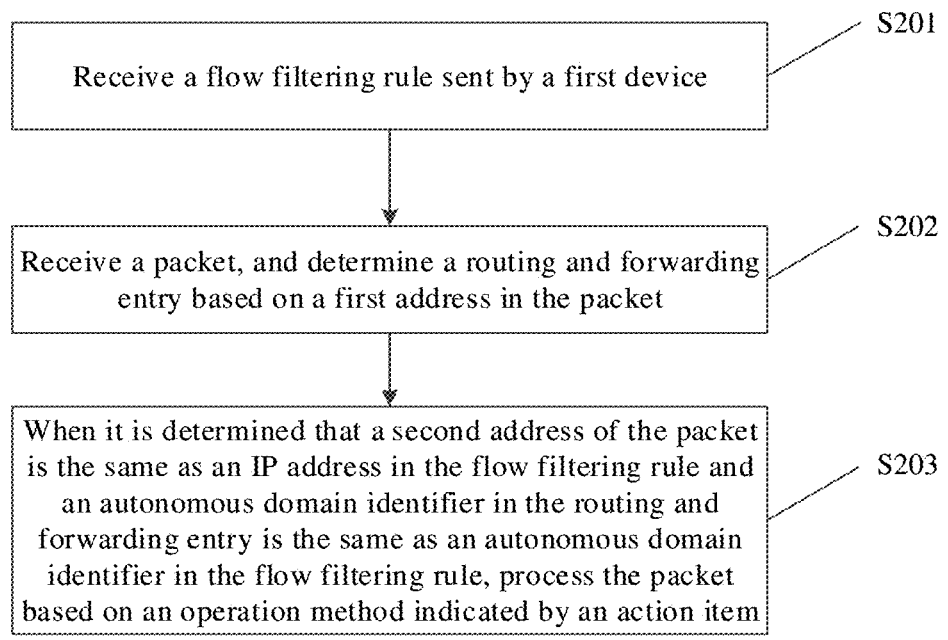
FIG. 5 is a flowchart of another packet processing method according to an embodiment of this application.

FIG. 5 is a flowchart of another packet processing method according to an embodiment of this application. The method may be applied to a second device, and includes the following steps.

S201. Receive a flow filtering rule sent by a first device.

As previously described, the second device may be a forwarding device, such as a router, a switch, a bridge, or a gateway, and the second device may receive a flow filtering rule sent by a first device. The first device may be a control device for generating and delivering a flow filtering rule, and may be a server, a terminal, a router, or the like. Specifically, a Border Gateway Protocol flow specification server may be used as the first device.

The flow filtering rule received by the second device may include a match term and an action term, where the match term may include an IP address and an autonomous domain identifier. Specifically, the IP address may be a source IP address of the packet, and the autonomous domain identifier is an identifier of an autonomous domain to which a device corresponding to a destination IP address of the packet belongs. Alternatively, the IP address may be a destination IP address of the packet, and the autonomous domain identifier is an identifier of an autonomous domain to which a device corresponding to a source IP address of the packet belongs.

Because the first device generates a relatively small quantity of flow filtering rules, the second device receives a relatively small quantity of flow filtering rules. For example, flow control is performed when m users access n IP addresses, if the m users belong to the same autonomous domain, the second device receives 1×n flow filtering rules, likewise, if the n IP addresses belong to the same autonomous domain, the second device receives m×1 flow filtering rules.

Certainly, the match item may also include other information about the packet, such as one or more of an IP protocol, a source port, a destination port, an ICMP type, an ICMP code, a TCP flag, a packet length, and a DSCP. An action item in the flow filtering rule corresponds to the match item, and is used to instruct to process, based on a packet processing mode indicated by the action item, a packet matching the match item. The action item may include discarding the packet, redirecting the packet, and marking the packet.

S202. Receive a packet, and determine a routing and forwarding entry based on a first address in the packet.

Figure 6:
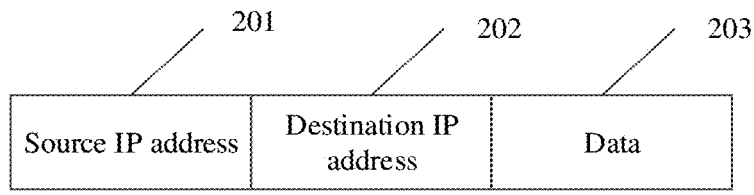
FIG. 6 is a schematic diagram of a packet according to an embodiment of this application.

As shown in FIG. 6, the packet received by the second device includes a source IP address 201, a destination IP address 202, and data 203. The source IP address 201 is an address of the network device that generates the packet, and the destination IP address 202 is an address of the network device that is expected to receive the packet. Normally, the second device needs to forward the packet, but when flow control is performed on the packet, other processing needs to be performed on the packet.

Figure 7:
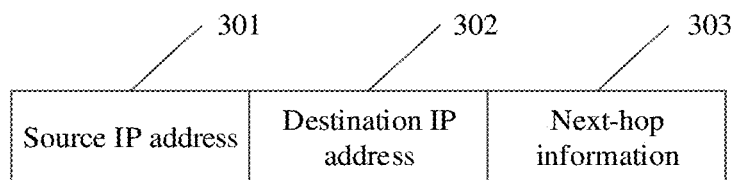
FIG. 7 is a schematic diagram of a routing and forwarding entry in the prior art.

A routing and forwarding table may be stored in the second device, and the routing and forwarding table includes a plurality of routing and forwarding entries. Each routing and forwarding entry correspondingly stores forwarding information of a packet. FIG. 7 is a schematic diagram of a routing and forwarding entry in the prior art, including a source IP address 301 of a packet, a destination IP address 302 of the packet, and next-hop information 303. Therefore, the second device can search the routing and forwarding table based on the information about the packet, such as the source IP address and the destination IP address, to determine next-hop information corresponding to the packet, and forward the packet based on the next-hop information.

Figure 8:
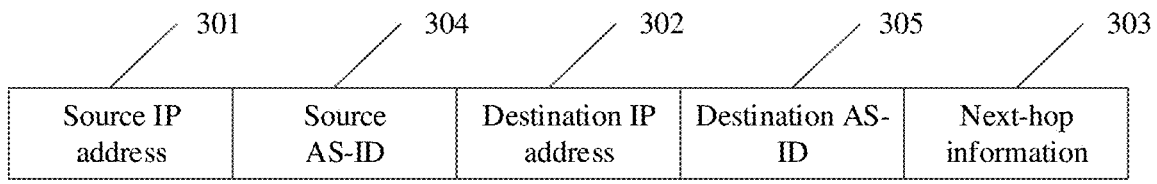
FIG. 8 is a schematic diagram of a routing and forwarding entry according to an embodiment of this application.

In this embodiment of this application, an autonomous domain identifier may be added to the routing and forwarding table. Specifically, an identifier of an autonomous domain to which the source IP address belongs may be added, or an identifier of an autonomous domain to which a device corresponding to the destination IP address belongs may be added, or both the identifier of the autonomous domain to which the device corresponding to the source IP address belongs and the identifier of the autonomous domain to which the device corresponding to the destination IP address belongs may be added. FIG. 8 is a schematic diagram of a routing and forwarding entry according to an embodiment of this application, including a source IP address 301, a source AS-ID 304, a destination IP address 302, a destination AS-ID 305, and next-hop information 303 of a packet, where the source AS-ID 304 is an identifier of an autonomous domain to which the source IP address 301 belongs, and the destination AS-ID 305 is an identifier of an autonomous domain to which the destination IP address 302 belongs.

The identifier of the autonomous domain to which the device corresponding to the source IP address belongs and/or the identifier of the autonomous domain to which the device corresponding to the destination IP address belongs in a routing and forwarding entry can be configured.

If the second device is an Interior Gateway Protocol device or a Border Gateway Protocol device, generally, the second device stores one or more autonomous domain identifiers. Specifically, if the second device is an Interior Gateway Protocol device and belongs to the same autonomous domain as the network device corresponding to the source IP address, an autonomous domain identifier stored in the second device is an identifier of the autonomous domain to which the device corresponding to the source IP address belongs, or if the second device is an Interior Gateway Protocol device and belongs to the same autonomous domain as the network device corresponding to the destination IP address, an autonomous domain identifier stored in the second device is an identifier of the autonomous domain to which the device corresponding to the destination IP address belongs. If the second device is a Border Gateway Protocol device, that is, the second device belongs to the same autonomous domain as the network device corresponding to the source IP address, and also belongs to the same autonomous domain as the network device corresponding to the destination IP address, the second device stores at least two autonomous domain identifiers. Therefore, the autonomous domain identifier to be added to the routing and forwarding table needs to be obtained based on the source IP address and the destination IP address.

After receiving the packet, the second device may determine a routing and forwarding entry based on the first address of the packet, and the entry includes at least the first address and the identifier of the autonomous domain to which the first address belongs. The first address may be the source IP address of the packet, and a second address may be the destination IP address of the packet. Correspondingly, the first address may be the destination IP address of the packet, and the second address may be the source IP address of the packet.

S203. When it is determined that the second address of the packet is the same as the IP address in the flow filtering rule and the autonomous domain identifier in the routing and forwarding entry is the same as the autonomous domain identifier in the flow filtering rule, process the packet based on the packet processing mode indicated by the action item.

It can be learned from the foregoing description that the second device can determine a routing and forwarding entry based on the first address of the packet, and the entry includes the first address and the identifier of the autonomous domain to which the first address belongs, that is, the first AS-ID. Then, the second device may perform matching between both the second address of the packet and the first AS-ID and the match item in the flow filtering rule. Specifically, the second device may determine whether the second address of the packet is the same as the IP address in the flow filtering rule, and whether the first AS-ID is the same as the autonomous domain identifier in the flow filtering rule. If the second address of the packet is the same as the IP address in the flow filtering rule, and the first AS-ID is the same as the autonomous domain identifier in the flow filtering rule, it is considered that the packet matches the match item in the flow filtering rule. In this case, the packet may be processed based on the packet processing mode indicated by the action item. The action item may include discarding the packet, redirecting the packet, and marking the packet.

For example, the match item in the flow filtering rule may include a source IP address IP-1 and an autonomous domain identifier AS1000 to which a device corresponding to a destination IP address belongs, and an action item corresponding to the match item may be discarding. If the source IP address and the destination IP address of the packet received by the second device are IP-1 and IP-2, respectively, a routing and forwarding entry corresponding to the destination IP address may be obtained by searching the routing and forwarding table based on the destination IP address, where the routing and forwarding entry includes the destination IP address IP-2 and the identifier of the autonomous domain to which the device corresponding to the destination IP address belongs, that is, the first AS-ID is AS1000. Therefore, it can be determined that the source IP address of the packet is the same as the IP address in the flow filtering rule. In addition, if the first AS-ID obtained based on the routing and forwarding entry is the same as the autonomous domain identifier in the flow filtering rule, it can be considered that the packet matches the match item in the flow filtering rule, and the packet is processed based on the packet processing mode indicated by the corresponding action item. Specifically, the packet may be discarded.

Likewise, the match item in the flow filtering rule may include the destination IP address IP-2 and the autonomous domain identifier AS2000 to which the device corresponding to the source IP address belongs, and the action item corresponding to the match item may be redirecting. If the source IP address and the destination IP address of the packet received by the second device are IP-1 and IP-2, respectively, according to the matching principle of the flow filtering rule, it can be determined that the source IP address is the first address and the destination IP address is the second address. A routing and forwarding entry corresponding to the source IP address can be obtained by searching the routing and forwarding table based on the source IP address. The routing and forwarding entry includes the source IP address IP-1 and an identifier of the autonomous domain to which the device corresponding to the source IP address belongs, that is, the first AS-ID is AS2000. Therefore, it can be determined that the destination IP address of the packet is the same as the IP address in the flow filtering rule. In addition, if the first AS-ID obtained based on the routing and forwarding entry is the same as the autonomous domain identifier in the flow filtering rule, it can be considered that the packet matches the match item in the flow filtering rule, and the packet is processed based on the packet processing mode indicated by the corresponding action item. Specifically, the packet may be redirected.

Figure 9:
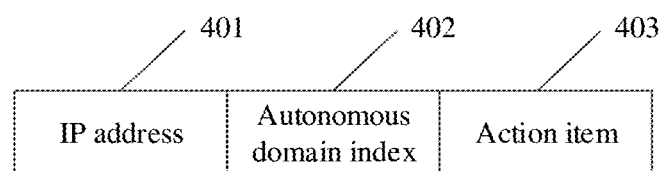
FIG. 9 is a schematic diagram of an access control entry according to an embodiment of this application.

To facilitate flow control based on a flow filtering rule, in this embodiment of this application, an access control list (ACL) may be generated according to the flow filtering rule, and the access control list may include a match item and an action item. FIG. 9 is a schematic diagram of an access control entry according to an embodiment of this application. A match item may include an IP address 401 and an autonomous domain index 402, which correspond to an IP address and an autonomous domain identifier in a flow filtering rule, respectively. The autonomous domain index corresponds to the autonomous domain identifier in the flow filtering rule. In actual application, a mapping relationship between an autonomous domain identifier and an autonomous domain index in a flow filtering rule may be established, and when the mapping relationship is met, the two are considered to be matched. The autonomous domain identifier and the autonomous domain index may be the same or different.

Therefore, the second device may determine the routing and forwarding entry based on the first address of the packet, and the entry includes the first address and the identifier of the autonomous domain to which the first address belongs, that is, the first AS-ID. Then, the second device may perform matching between the second address of the packet and the IP address in the access control list and perform matching between the first AS-ID and the autonomous domain index in the access control list. Specifically, the second device may determine whether the second address of the packet is the same as the IP address in the access control list and whether the first AS-ID matches the autonomous domain index in the access control list. If the second address of the packet is the same as the IP address in the access control list and the first AS-ID matches the autonomous domain index in the access control list, it is considered that the packet matches the match item in the access control list. In this case, the packet may be processed based on the packet processing mode indicated by the action item.

In the another packet processing method provided in this embodiment of this application, the second device receives the flow filtering rule sent by the first device, where the match item includes an IP address and an autonomous domain identifier. Autonomous domain identifiers may be used to distinguish between different autonomous domains, and one autonomous domain may include a plurality of network devices, which correspond to information about the plurality of network devices. The second device receives the packet, determines a routing and forwarding entry based on the first address in the packet, where the routing and forwarding entry includes an autonomous domain identifier, and when determining that the second address of the packet is the same as the IP address in the flow filtering rule and the autonomous domain identifier in the routing and forwarding entry is the same as the autonomous domain identifier in the flow filtering rule, the second device processes the packet based on the packet processing mode indicated by the action item. That is, in this embodiment of this application, IP addresses of network devices in an autonomous domain corresponding to the autonomous domain identifier are aggregated, and a flow filtering rule is generated based on the autonomous domain identifier. In this way, only one flow filtering rule needs to be generated for all the network devices in the autonomous domain that communicate with a network device corresponding to the IP address in the match item, and one flow filtering rule no longer needs to be generated for each network device in the autonomous domain as in the conventional technology, so that the quantity of flow filtering rules generated is reduced, and the first device can perform matching on received packets based on a relatively small quantity of flow filtering rules and process matched packets, thereby saving the network resources.

Figure 10:
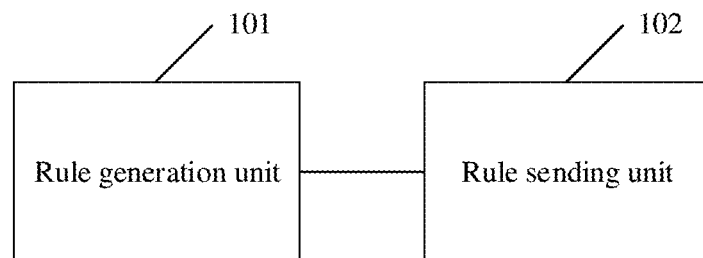
FIG. 10 is a structural block diagram of a packet processing apparatus according to an embodiment of this application.

Referring to FIG. 10, an embodiment of this application further provides a packet processing apparatus, where the apparatus is used in a first device. The first device may implement a function of the first device in the embodiment shown in FIG. 4 or FIG. 5. The first device includes a rule generation unit 101 and a rule sending unit 102. The rule generation unit 101 is configured to perform step S101 in the embodiment shown in FIG. 4, and the rule sending unit 102 is configured to perform step S102 in the embodiment shown in FIG. 4. Specifically, the rule generation unit 101 is configured to generate a flow filtering rule, where the flow filtering rule includes a match item and an action item, and the match item includes an internet protocol IP address and an autonomous domain identifier, and the rule sending unit 102 is configured to send the flow filtering rule to a second device, where the action item is used to instruct the second device to process, based on a packet processing mode indicated by the action item, a packet matching the match item.

Optionally, the IP address is a source IP address of the packet, and the autonomous domain identifier is an identifier of an autonomous domain to which a device corresponding to a destination IP address of the packet belongs.

Optionally, the IP address is a destination IP address of the packet, and the autonomous domain identifier is an identifier of an autonomous domain to which a device corresponding to a source IP address of the packet belongs.

Optionally, the autonomous domain identifier is an identifier of an autonomous domain to which the second device belongs.

Figure 11:
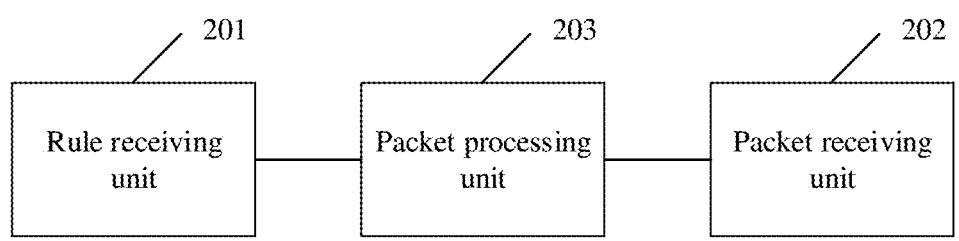
FIG. 11 is a structural block diagram of another packet processing apparatus according to an embodiment of this application.

Referring to FIG. 11, an embodiment of this application further provides a packet processing apparatus, where the apparatus is used in a second device. The second device may implement a function of the second device in the embodiment shown in FIG. 4 or FIG. 5. The second device includes a rule receiving unit 201, a packet receiving unit 202, and a packet processing unit 203. The rule receiving unit 201 is configured to perform step S201 in the embodiment shown in FIG. 5, the packet receiving unit 202 is configured to perform step S202 in the embodiment shown in FIG. 5, and the packet processing unit 203 is configured to perform step S203 in the embodiment shown in FIG. 5. Specifically, the rule receiving unit 201 is configured to receive a flow filtering rule sent by a first device, where the flow filtering rule includes a match item and an action item, and the match item includes an internet protocol IP address and an autonomous domain identifier, the packet receiving unit 202 is configured to receive a packet, and determine a routing and forwarding entry based on a first address in the packet, where the routing and forwarding entry includes an autonomous domain identifier, and the packet processing unit 203 is configured to, when it is determined that a second address of the packet matches the IP address in the flow filtering rule and the autonomous domain identifier in the routing and forwarding entry is the same as the autonomous domain identifier in the flow filtering rule, process the packet based on a packet processing mode indicated by the action item.

Optionally, the first address is a destination IP address of the packet, and the second address is a source IP address of the packet.

Optionally, the first address is a source IP address of the packet, and the second address is a destination IP address of the packet.

Optionally, the packet processing mode indicated by the action item includes one or more processing modes, including discarding the packet, redirecting the packet, and marking the packet.

Optionally, the apparatus further includes a list generation unit, configured to generate an access control list according to the flow filtering rule, where the access control list stores the IP address, an autonomous domain index, and the action item, and the autonomous domain index corresponds to the autonomous domain identifier.

The packet processing unit is specifically configured to, when the second device determines that the second address of the packet is the same as the IP address in the access control list and the autonomous domain identifier in the routing and forwarding entry matches the autonomous domain index in the access control list, process the packet based on the packet processing mode indicated by the action item stored in the access control list.

Figure 12:
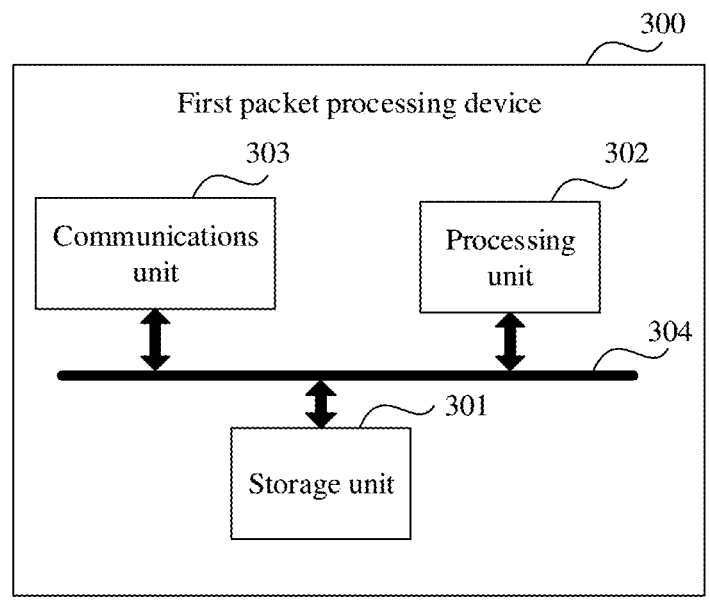
FIG. 12 is a diagram of a hardware architecture of a packet processing device according to an embodiment of this application.

Referring to FIG. 12, an embodiment of this application further provides a first packet processing device 300, where the device is a first device. The device 300 may implement a function of the first device in the embodiment shown in FIG. 4 or FIG. 5. The device includes a storage unit 301, a processing unit 302, and a communications unit 303.

The storage unit 301 is configured to store an instruction.

The processing unit 302 is configured to execute the instruction in the storage unit 301, to perform the foregoing packet processing method applied to the first device in the embodiment shown in FIG. 4 or FIG. 5.

The communications unit 303 is configured to communicate with a second device.

The storage unit 301, the processing unit 302, and the communications unit 303 are mutually connected by using a bus 304. The bus 304 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 12, but this does not mean that there is only one bus or only one type of bus.

Figure 13:
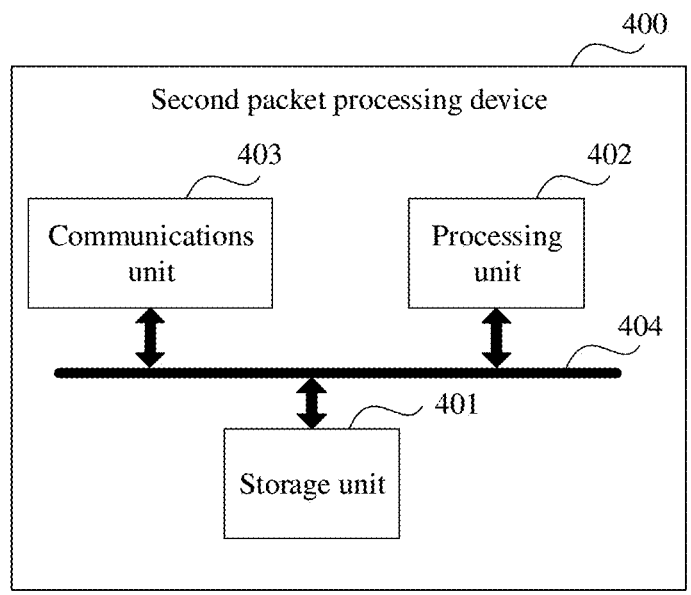
FIG. 13 is a diagram of a hardware architecture of another packet processing device according to an embodiment of this application.

Referring to FIG. 13, an embodiment of this application further provides a second packet processing device 400. The device 400 may implement a function of the second device in the embodiment shown in FIG. 4 or FIG. 5 and the device is a second device. The second device includes a storage unit 401, a processing unit 402, and a communications unit 403.

The storage unit 401 is configured to store an instruction.

The processing unit 402 is configured to execute the instruction in the storage unit 401, to perform the foregoing packet processing method applied to the second device in the embodiment shown in FIG. 4 or FIG. 5.

The communications unit 403 is configured to communicate with a first device.

The storage unit 401, the processing unit 402, and the communications unit 403 are mutually connected by using a bus 404. The bus 404 may be a peripheral component interconnect (PCI for short) bus, an extended industry standard architecture (EISA) bus, or the like. The bus may be classified into an address bus, a data bus, a control bus, and the like. For ease of representation, only one thick line is used to represent the bus in FIG. 13, but this does not mean that there is only one bus or only one type of bus.

The storage unit 301 and the storage unit 401 each may be a random access memory (RAM), a flash memory (flash), a read-only memory (ROM), an erasable programmable read-only memory (EPROM), an electrically erasable programmable read-only memory (EEPROM), a register, a hard disk, a removable hard disk, a CD-ROM, or any other form of storage medium known to a person skilled in the art.

The processing unit 302 and the processing unit 402 each may be a central processing unit (CPU), a general-purpose processor, a digital signal processor (DSP), an application-specific integrated circuit (ASIC), a field programmable gate array (FPGA), or another programmable logic device, a transistor logic device, a hardware component, or any combination thereof. The processing unit may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor.

The communications unit 303 and the communications unit 403 each may be, for example, an interface card, or may be an ethernet interface or an asynchronous transfer mode (ATM) interface.

An embodiment of the present invention provides a packet processing system, where the system is configured to implement the packet processing method in the foregoing method embodiments. The system includes the first device in the embodiment shown in FIG. 10 and the second device in the embodiment shown in FIG. 11, or the system includes the first device in the embodiment shown in FIG. 12 and the second device in the embodiment shown in FIG. 13.

An embodiment of this application further provides a computer-readable storage medium, where the computer-readable storage medium includes an instruction, and when the instruction is run on a computer, the computer is enabled to perform the foregoing packet processing method applied to the first device and/or the foregoing packet processing method applied to the second device.

An embodiment of this application further provides a computer program product including an instruction, where when the computer program product runs on a computer, the computer is enabled to perform the foregoing packet processing method applied to the first device and/or the foregoing packet processing method applied to the second device.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and there may be another division manner in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, that is, may be located at one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The foregoing integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

A person skilled in the art should be aware that in the foregoing one or more examples, functions described in the present invention may be implemented by hardware, software, firmware, or any combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another place, and the storage medium may be any available medium accessible to a general-purpose or dedicated computer.

In the foregoing specific implementations, the objectives, technical solutions, and beneficial effects of the present invention are further described in detail. It should be understood that the foregoing descriptions are merely specific implementations of the present invention.

In conclusion, the foregoing embodiments are merely intended for describing the technical solutions of this application, but not for limiting this application. Although this application is described in detail with reference to the foregoing embodiments, a person of ordinary skill in the art should understand that the technical solutions described in the foregoing embodiments may still be modified, or some technical features thereof may be equivalently replaced. However, these modifications or replacements do not cause the essence of the corresponding technical solutions to depart from the scope of the technical solutions in the embodiments of this application.

What is claimed is:

1. A method, comprising:
generating, by a first device, a flow filtering rule, wherein the flow filtering rule comprises a match item and an action item, wherein the match item comprises a source Internet Protocol (IP) address and an autonomous domain identifier, and wherein the autonomous domain identifier is an identifier of an autonomous domain to which a destination IP address belongs; and
sending, by the first device, the flow filtering rule to a second device, wherein the action item instructs the second device to process, based on a packet processing mode indicated by the action item, a packet matching the match item, the packet matching the match item comprising a source IP address of the packet matching the source IP address of the match item and an autonomous domain identifier to which a destination IP address of the packet belongs matching the autonomous domain identifier of the match item.

2. The method according to claim 1, wherein:
the first device comprises a Border Gateway Protocol (BGP) flow specification server; and
sending, by the first device, the flow filtering rule to the second device comprises sending, by the BGP flow specification server, the flow filtering rule to the second device.

3. The method according to claim 1, wherein the packet processing mode indicated by the action item comprises one or more of discarding the packet, redirecting the packet, or marking the packet.

4. A method, comprising:
receiving, by a second device, a flow filtering rule sent by a first device, wherein the flow filtering rule comprises a match item and an action item, wherein the match item comprises a source Internet Protocol (IP) address and an autonomous domain identifier, and wherein the autonomous domain identifier is an identifier of an autonomous domain to which a destination IP address belongs;
receiving, by the second device, a packet; and
processing, by the second device, the packet based on a packet processing mode indicated by the action item, wherein a source IP address of the packet matches the source IP address of the match item, and wherein an autonomous domain identifier to which a destination IP address of the packet belongs matches the autonomous domain identifier of the match item.

5. The method according to claim 4, wherein:
the first device comprises a Border Gateway Protocol (BGP) flow specification server that sends the flow filtering rule to the second device; and
receiving, by the second device, the flow filtering rule sent by the first device comprises receiving, by the second device, the flow filtering rule sent to the second device by the BGP flow specification server.

6. The method according to claim 4, wherein the packet processing mode indicated by the action item comprises one or more of discarding the packet, redirecting the packet, or marking the packet.

7. The method according to claim 4, further comprising:
generating an access control list according to the flow filtering rule, wherein the access control list stores the IP address of the match item, an autonomous domain index, and the action item of the match item, the autonomous domain index corresponding to the autonomous domain identifier of the match item;
determining, by the second device, that the packet matches the match item of the flow filtering rule, wherein determining that the packet matches the match item of the flow filter rule comprises determining that the source IP address of the packet matches the source IP address of the match item stored in the access control list, and comprises determining that the autonomous domain identifier to which the destination IP address of the packet belongs matches the autonomous domain index stored in the access control list; and
processing, by the second device in response to determining that the packet matches the match item of the flow filtering rule, the packet based on the packet processing mode indicated by the action item stored in the access control list.

8. A first device, comprising:
at least one processor; and
one or more memories coupled to the at least one processor and storing instructions for execution by the at least one processor, wherein the instructions, when executed by the at least one processor, cause the first device to:
generate a flow filtering rule, wherein the flow filtering rule comprises a match item and an action item, wherein the match item comprises a source Internet Protocol (IP) address and an autonomous domain identifier, and wherein the autonomous domain identifier is an identifier of an autonomous domain to which a destination IP address belongs; and
send the flow filtering rule to a second device, wherein the action item instructs the second device to process, based on a packet processing mode indicated by the action item, a packet matching the match item, the packet matching the match item comprising a source IP address of the packet matching the source IP address of the match item and an autonomous domain identifier to which a destination IP address of the packet belongs matching the autonomous domain identifier of the match item.

9. The first device according to claim 8, wherein:
the first device comprises a Border Gateway Protocol (BGP) flow specification server.

10. The first device according to claim 8, wherein the packet processing mode indicated by the action item comprises one or more of discarding the packet, redirecting the packet, or marking the packet.

11. A second device, comprising:
at least one processor; and
one or more memories coupled to the at least one processor and storing instructions for execution by the at least one processor, wherein the instructions, when executed by the at least one processor, cause the second device to:
receive a flow filtering rule sent by a first device, wherein the flow filtering rule comprises a match item and an action item, wherein the match item comprises a source Internet Protocol (IP) address and an autonomous domain identifier, and wherein the autonomous domain identifier is an identifier of an autonomous domain to which a destination IP address belongs; and
process, in response to receiving a packet, the packet based on a packet processing mode indicated by the action item, wherein a source IP address of the packet matches the source IP address of the match item, and wherein an autonomous domain identifier to which a destination IP address of the packet belongs matches the autonomous domain identifier of the match item.

12. The second device according to claim 11, wherein: the first device comprises a Border Gateway Protocol (BGP) flow specification server that sends the flow filtering rule to the second device.

13. The second device according to claim 11, wherein the packet processing mode indicated by the action item comprises one or more of discarding the packet, redirecting the packet, or marking the packet.

14. The second device according to claim 11, wherein the instructions, when executed by the at least one processor, cause the second device to:
generate an access control list according to the flow filtering rule, wherein the access control list stores the IP address of the match item, an autonomous domain index, and the action item of the match item, the autonomous domain index corresponding to the autonomous domain identifier of the match item; and
determine that the packet matches the match item of the flow filtering rule, wherein determining that the packet matches the flow filtering rule comprises determining that the source IP address of the packet matches the source IP address of the match item stored in the access control list, and comprises determining that the autonomous domain identifier to which the destination IP address of the packet belongs matches the autonomous domain index stored in the access control list; and
process, in response to determining that the packet matches the match item of the flow filtering rule, the packet based on the packet processing mode indicated by the action item stored in the access control list.

15. A system, comprising:
a first device configured to:
generate a flow filtering rule, wherein the flow filtering rule comprises a match item and an action item, wherein the match item comprises a source Internet Protocol (IP) address and an autonomous domain identifier, and wherein the autonomous domain identifier is an identifier of an autonomous domain to which a destination IP address belongs; and
send the flow filtering rule; and
a second device configured to:
receive the flow filtering rule sent by the first device; and
process, in response to receiving a packet and further in response to a source IP address of the packet matching the source IP address of the match item and an autonomous domain identifier to which a destination IP address of the packet belongs matching the autonomous domain identifier of the match item, the packet based on a packet processing mode indicated by the action item.

16. The system according to claim 15, wherein: the first device comprises a Border Gateway Protocol (BGP) flow specification server.

17. The system according to claim 15, wherein the packet processing mode indicated by the action item comprises one or more of discarding the packet, redirecting the packet, or marking the packet.

18. The system according to claim 15, wherein the second device is configured to:
generate an access control list according to the flow filtering rule, wherein the access control list stores the IP address of the match item, an autonomous domain index, and the action item of the match item, the autonomous domain index corresponding to the autonomous domain identifier of the match item; and
determine that the packet matches the match item of the flow filtering rule, wherein determining that the packet matches the flow filtering rule comprises determining that the source IP address of the packet matches the source IP address of the match item stored in the access control list, and comprises determining that the autonomous domain identifier to which the destination IP address of the packet belongs matches the autonomous domain index stored in the access control list; and
process, in response to determining that the packet matches the match item of the flow filtering rule, the packet based on the packet processing mode indicated by the action item stored in the access control list.

* * * * *